(12) United States Patent
Wu

(10) Patent No.: US 11,808,983 B2
(45) Date of Patent: Nov. 7, 2023

(54) MULTI-FIBER SPLICE PROTECTOR WITH COMPACT SPLICE-ON FURCATION HOUSING

(71) Applicant: CORNING RESEARCH & DEVELOPMENT CORPORATION, Corning, NY (US)

(72) Inventor: Qi Wu, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/521,040

(22) Filed: Nov. 8, 2021

(65) Prior Publication Data

US 2022/0163722 A1    May 26, 2022

Related U.S. Application Data

(60) Provisional application No. 63/117,845, filed on Nov. 24, 2020.

(51) Int. Cl.
| | | |
|---|---|---|
| *G02B 6/255* | (2006.01) | |
| *G02B 6/38* | (2006.01) | |
| *G02B 6/44* | (2006.01) | |
| *G02B 6/46* | (2006.01) | |

(52) U.S. Cl.
CPC ......... *G02B 6/2558* (2013.01); *G02B 6/3849* (2013.01); *G02B 6/3885* (2013.01); *G02B 6/4471* (2013.01); *G02B 6/4488* (2013.01); *G02B 6/567* (2023.05)

(58) Field of Classification Search
CPC .. G02B 6/2558; G02B 6/3849; G02B 6/3885; G02B 6/4471; G02B 6/4488; G02B 6/4498
See application file for complete search history.

(56) References Cited

U.S. PATENT DOCUMENTS

| | | |
|---|---|---|
| 4,018,983 A | 4/1977 | Pedlow |
| 4,077,702 A | 3/1978 | Kunze et al. |
| 4,254,865 A | 3/1981 | Pacey et al. |
| 4,509,820 A | 4/1985 | Murata et al. |
| 4,537,468 A | 8/1985 | Degoix et al. |
| 4,714,316 A | 12/1987 | Moore et al. |
| 4,778,242 A | 10/1988 | Ota et al. |
| 4,786,138 A | 11/1988 | Buckley |
| 4,812,010 A | 3/1989 | Osaka et al. |

(Continued)

FOREIGN PATENT DOCUMENTS

| | | |
|---|---|---|
| CN | 1548492 A | 11/2004 |
| CN | 1735825 A | 2/2006 |

(Continued)

OTHER PUBLICATIONS

International Search Report and Written Opinion of the International Searching Authority; PCT/US2021/059351; dated Feb. 11, 2022; p. 12; European Patent Office.

(Continued)

*Primary Examiner* — Ryan A Lepisto

(57) ABSTRACT

The present disclosure relates to protecting splices of multiple optical fibers with a low-profile multi-fiber splice protector and a compact splice on furcation housing. The present disclosure also relates to optimal fiber wiring patterns within an optical fiber cable assembly.

18 Claims, 9 Drawing Sheets

(56) References Cited

U.S. PATENT DOCUMENTS

| | | |
|---|---|---|
| 4,865,411 A | 9/1989 | Darsey et al. |
| 4,878,732 A | 11/1989 | Rohner et al. |
| 4,923,274 A | 5/1990 | Dean |
| 5,022,735 A | 6/1991 | Dahlgren |
| 5,093,048 A | 3/1992 | Kagan |
| 5,212,756 A | 5/1993 | Eoll |
| 5,231,688 A | 7/1993 | Zimmer |
| 5,247,598 A | 9/1993 | Takimoto et al. |
| 5,367,591 A | 11/1994 | Seike et al. |
| 5,416,873 A | 5/1995 | Huebscher et al. |
| 5,477,507 A | 12/1995 | Kaplan |
| 5,682,454 A | 10/1997 | Gaillard |
| 5,720,908 A | 2/1998 | Gaillard |
| 5,731,051 A | 3/1998 | Fahey et al. |
| 5,832,162 A | 11/1998 | Sarbell |
| 5,971,624 A | 10/1999 | Giebel et al. |
| 6,099,170 A | 8/2000 | Sarbell |
| 6,152,611 A | 11/2000 | Mardirossian et al. |
| 6,282,353 B1 | 8/2001 | Clark |
| 6,295,400 B1 | 9/2001 | Shahid |
| 6,360,044 B1 | 3/2002 | Mills et al. |
| 6,367,990 B1 | 4/2002 | Dumitriu |
| 6,421,493 B1 | 7/2002 | Burek et al. |
| 6,454,471 B1 | 9/2002 | Ware et al. |
| 6,485,199 B1 | 11/2002 | Ware et al. |
| 6,498,882 B1 * | 12/2002 | Buckelew ............ G02B 6/4472 385/52 |
| 6,614,971 B2 | 9/2003 | Sun et al. |
| 6,676,299 B1 | 1/2004 | Durrant et al. |
| 6,728,451 B2 | 4/2004 | Kordahi |
| 6,738,555 B1 | 5/2004 | Cooke et al. |
| 6,742,705 B1 | 6/2004 | Clark |
| 6,771,961 B2 | 8/2004 | Bamburak et al. |
| 6,869,227 B2 | 3/2005 | Del et al. |
| 7,118,035 B2 | 10/2006 | Clark |
| 7,364,375 B1 | 4/2008 | Jones |
| 7,461,981 B2 | 12/2008 | Yow et al. |
| 7,901,147 B1 | 3/2011 | De et al. |
| 8,047,726 B2 | 11/2011 | Tamekuni et al. |
| 8,096,712 B2 | 1/2012 | Solomon et al. |
| 8,388,242 B2 | 3/2013 | Kachmar et al. |
| 8,408,811 B2 | 4/2013 | De et al. |
| 8,408,818 B2 | 4/2013 | Homma |
| 8,457,461 B2 * | 6/2013 | Ott ..................... G02B 6/2558 385/103 |
| 8,548,294 B2 | 10/2013 | Toge et al. |
| 8,573,855 B2 * | 11/2013 | Nhep ................... G02B 6/4472 385/86 |
| 8,678,670 B2 | 3/2014 | Takahashi et al. |
| 8,696,221 B2 | 4/2014 | Vastmans et al. |
| 8,702,326 B2 | 4/2014 | Faulkner et al. |
| 8,740,479 B2 * | 6/2014 | Shitama ................ G02B 6/255 385/98 |
| 8,824,841 B1 | 9/2014 | Mullen |
| 8,915,659 B2 | 12/2014 | Marcouiller et al. |
| 9,063,286 B2 | 6/2015 | Durrant et al. |
| 9,089,931 B1 | 7/2015 | Carberry et al. |
| 9,167,626 B1 | 10/2015 | Wu |
| 9,360,624 B2 | 6/2016 | Faulkner et al. |
| 9,389,382 B2 | 7/2016 | Blazer et al. |
| 9,604,261 B2 | 3/2017 | Wu |
| 9,857,548 B2 | 1/2018 | Nielsen et al. |
| 9,939,599 B2 | 4/2018 | Blazer et al. |
| 10,018,782 B2 | 7/2018 | Wu |
| 10,018,783 B2 * | 7/2018 | Seri ..................... G02B 6/4472 |
| 10,018,798 B2 | 7/2018 | Arson et al. |
| 10,185,110 B2 | 1/2019 | Kaneko et al. |
| 10,197,746 B2 | 2/2019 | Childers et al. |
| 10,209,447 B2 | 2/2019 | Filipowicz et al. |
| 10,353,154 B2 | 7/2019 | Ott et al. |
| 10,658,790 B2 | 5/2020 | Finona |
| 10,921,540 B2 | 2/2021 | Wu |
| 10,976,492 B2 | 4/2021 | Wu |
| 11,131,811 B2 | 9/2021 | Wu |
| 2002/0003934 A1 | 1/2002 | Clark |
| 2003/0016923 A1 | 1/2003 | Summers et al. |
| 2003/0103743 A1 | 6/2003 | Sun et al. |
| 2004/0062480 A1 | 4/2004 | Cronk et al. |
| 2004/0218891 A1 | 11/2004 | Clark |
| 2005/0238313 A1 | 10/2005 | Clark |
| 2005/0271338 A1 | 12/2005 | Livingston |
| 2006/0093281 A1 | 5/2006 | Kesler |
| 2009/0103870 A1 | 4/2009 | Solomon et al. |
| 2011/0110635 A1 | 5/2011 | Toge et al. |
| 2011/0286704 A1 | 11/2011 | Rubinstein et al. |
| 2011/0311185 A1 | 12/2011 | Kachmar et al. |
| 2012/0020630 A1 | 1/2012 | Vastmans et al. |
| 2012/0243838 A1 | 9/2012 | Sato et al. |
| 2012/0281951 A1 | 11/2012 | Takahashi et al. |
| 2013/0074303 A1 | 3/2013 | Durrant et al. |
| 2013/0251317 A1 | 9/2013 | Faulkner et al. |
| 2013/0302003 A1 | 11/2013 | Bookbinder et al. |
| 2014/0321813 A1 | 10/2014 | Lu |
| 2015/0110450 A1 | 4/2015 | Jones et al. |
| 2015/0253503 A1 | 9/2015 | Saito et al. |
| 2015/0346445 A1 | 12/2015 | Blazer et al. |
| 2016/0116683 A1 | 4/2016 | Murashima et al. |
| 2016/0139341 A1 | 5/2016 | Morioka et al. |
| 2016/0170154 A1 | 6/2016 | Lu |
| 2016/0299306 A1 | 10/2016 | Mcalpine et al. |
| 2016/0299310 A1 | 10/2016 | Kaneko et al. |
| 2016/0349453 A1 | 12/2016 | Wu |
| 2017/0001224 A1 | 1/2017 | Wu |
| 2017/0010433 A1 | 1/2017 | Nielsen et al. |
| 2017/0031121 A1 | 2/2017 | Blazer et al. |
| 2018/0011262 A1 | 1/2018 | Chabot et al. |
| 2018/0024294 A1 | 1/2018 | Wang et al. |
| 2018/0210152 A1 | 7/2018 | Giotto et al. |
| 2018/0351292 A1 | 12/2018 | Finona |
| 2019/0137689 A1 | 5/2019 | Filipowicz et al. |
| 2019/0369332 A1 | 12/2019 | Bohbot |
| 2020/0012047 A1 | 1/2020 | Wu |
| 2020/0081218 A1 | 3/2020 | Wu |
| 2021/0033793 A1 | 2/2021 | Wu |
| 2021/0116661 A1 | 4/2021 | Wang et al. |
| 2021/0302656 A1 | 9/2021 | Wu |
| 2022/0026658 A1 | 1/2022 | Gajek |

FOREIGN PATENT DOCUMENTS

| | | |
|---|---|---|
| CN | 202494801 U | 10/2012 |
| CN | 105717576 A | 6/2016 |
| DE | 202007013173 U1 | 12/2007 |
| EP | 0057828 A1 | 8/1982 |
| EP | 0278423 A2 | 8/1988 |
| EP | 0537413 A1 | 4/1993 |
| EP | 1168018 A2 | 1/2002 |
| EP | 3229051 A1 | 10/2017 |
| JP | 55-103513 A | 8/1980 |
| JP | 55-129305 A | 10/1980 |
| JP | 58-147707 A | 9/1983 |
| JP | 59-037515 A | 3/1984 |
| JP | 62-015504 A | 1/1987 |
| JP | 05-233859 A | 9/1993 |
| JP | 11-174237 A | 7/1999 |
| JP | 11-326677 A | 11/1999 |
| JP | 2001-147340 A | 5/2001 |
| JP | 2004-347801 A | 12/2004 |
| JP | 2005-250294 A | 9/2005 |
| JP | 2009-163165 A | 7/2009 |
| JP | 2011-232375 A | 11/2011 |
| JP | 5233859 B2 | 7/2013 |
| WO | 99/59013 A1 | 11/1999 |
| WO | 2004/040347 A1 | 5/2004 |
| WO | 2009/040271 A2 | 4/2009 |
| WO | 2011/112764 A1 | 9/2011 |
| WO | 2013/007969 A2 | 1/2013 |
| WO | 2013/126429 A2 | 8/2013 |
| WO | 2018/037078 A1 | 3/2018 |
| WO | 2018/132918 A1 | 7/2018 |

(56) References Cited

FOREIGN PATENT DOCUMENTS

| WO | 2018/175122 A1 | 9/2018 |
| WO | 2020/219477 A1 | 10/2020 |

OTHER PUBLICATIONS

Duke et al; "Benefits of CO2 Laser Heating for High Reliability Fiber Splicing," Proc. SPIE 9735, pp. B1-B12, 2016.

Friebele et al; "Method for Recoating Optical Fibres With Polyimide," Electron. Lett, 34, pp. 1249-1250, 1998.

Glaesemann et al; "The Mechanical Reliability of Corning Optical Fiber in Small Bend Scenarios"; Corning; ISO 9001 Registered; (2007) 8 Pages.

International Search Report and Written Opinion of the International Searching Authority; PCT/US2019/047507; dated Nov. 15, 2019; 17 Pages; European Patent Office.

International Search Report and Written Opinion of the International Searching Authority; PCT/US2019/048507; dated Nov. 15, 2019, 15 pages; European Patent Office.

International Search Report and Written Opinion of the International Searching Authority; PCT/US2021/025200; dated Jul. 1, 2021; 17 pages; European Patent Office.

Matsumoto et al.; "Design and Characteristics of Reinforcement Method for Fusion Spliced Optical Fiber," J. Lightwave Technol., LT-3, pp. 322-327, 1985.

Serafini.; "Compact and Reliable Protection of Single-Fiber and Ribbon-Fiber Fusion Splices" Proc. SPIE 1973, pp. 306-315 1993.

Trunk et al.; "Protection With Heat-Shrinkable Sleeves for Optical Fiber Arc Fusion Splicing," Proc. SPIE 1365, Components for Fiber Optic Applications V, pp. 124-130, 1990.

Volotinen et al; "Effect of Mechanical Stripping and Arc-Fusion on the Strength and Aging of a Spliced Recoated Optical Fiber," Mat. Res. Soc. Symp. Proc. 531, pp. 163-168, 1998.

Wood, "Reliability of Optical Connectors and Splices," Proc. SPIE 2074, pp. 276-287, 1994.

Yablon, A.O.; "Optical Fiber Fusion Splicing," Springer, 2005; pp. 161-180.

Yamada et al; "ARC Usion Splicer With Profile Alignment System for High-Strength Low-Loss Optical Submarine Cable," J. Lightwave Technol., LT-4, pp. 1204-1210, 1986.

\* cited by examiner

MULTI-FIBER SPLICE PROTECTOR WITH COMPACT SPLICE-ON FURCATION HOUSING

PRIORITY APPLICATION

This application claims the benefit of priority of U.S. Provisional Application No. 63/117,845, filed on Nov. 24, 2020, the content of which is relied upon and incorporated herein by reference in its entirety.

FIELD OF THE DISCLOSURE

The disclosure relates generally to fiber optic splice protectors and fiber optic cable assemblies incorporating multiple fusion splices, in addition to a compact, splice-on furcation housing.

BACKGROUND OF THE DISCLOSURE

Optical fibers are useful in a wide variety of applications, including the telecommunications industry for voice, video, and data transmission. Fiber optic cables are frequently produced by extruding thermoplastic material (e.g., polyvinylchloride (PVC)) over at least one coated optical fiber.

FIG. 1 is a cross-sectional view of an exemplary coated optical fiber 10 that includes a glass core 12, glass cladding 14 surrounding the glass core 12, and a multi-layer polymer coating 20 (including an inner primary coating layer 16 and an outer secondary coating layer 18) surrounding the glass cladding 14. The inner primary coating layer 16 may be configured to act as a shock absorber to minimize attenuation caused by any micro-bending of the coated optical fiber 10. The outer secondary coating layer 18 may be configured to protect the inner primary coating layer 16 against mechanical damage, and to act as a barrier to lateral forces. The outer diameter of the coated optical fiber 10 may be about 200 µm, about 250 µm, or any other suitable value. Optionally, an ink layer (e.g., having a thickness of about 5 µm) may be arranged over the outer secondary coating layer 18 of the coated optical fiber 10 to color the fiber (e.g., as is commonly used in ribbonized optical fibers), or a coloring agent may be mixed with the coating material that forms the outer secondary coating layer 18. An additional covering (not shown), which may be embodied in a tight buffer layer or a loose tube (also known as a furcation tube or fanout tube), may be applied to the coated optical fiber 10 to provide additional protection and allow for easier handling, wherein the resulting buffered or furcated optical fibers typically have an outer diameter of about 900 µm.

In this disclosure, the term "optical fiber" (or "fiber") will be used in a generic sense and may encompass bare optical fibers, coated optical fibers, or buffered optical fibers, as well as optical fibers including different sections corresponding to these fiber types, unless it is clear from the context which of the types is intended. "Bare optical fibers" (including "bare glass optical fibers") or "bare sections" are those with no coating present on the fiber cladding. "Coated optical fibers" or "coated sections" include a single or multi-layer coating (typically an acrylic material) surrounding the fiber cladding and have a nominal (i.e., stated) diameter no greater than twice the nominal diameter of the bare optical fiber. "Buffered optical fibers" or "buffered sections" are coated optical fibers with an additional buffer that increases the nominal diameter of the optical fiber to more than twice the nominal diameter of the bare optical fiber, with 900 µm being the most typical nominal diameter. Buffered optical fibers may also be referred to as "buffered cables." Finally, the term "unbuffered optical fibers" refers to optical fibers without a buffer, and therefore may encompass either bare optical fibers or coated optical fibers.

Optical fiber fusion splicing, which is the process by which a permanent, low-loss, high-strength, fused (or welded) joint is formed between two optical fibers, typically involves multiple tasks. First, polymer coatings (e.g., coating layers 16, 18 of FIG. 1) of coated optical fibers (e.g., coated optical fiber 10 of FIG. 1) are stripped to expose glass cladding (e.g., glass cladding 14 of FIG. 1). Next, flat fiber end faces are formed, typically by cleaving exposed glass portions of the fibers. Then the fibers are laterally aligned to each other. The fiber tips must be heated to their softening point and pressed together to form a joint. The completed fusion splice must also be protected from the environment using packaging, which serves to shield fiber surfaces from mechanical degradation (e.g., abrasion) and chemical degradation (e.g., humidity) to ensure that splices exhibit long-term reliability. Optical fibers must typically be able to withstand service temperatures spanning at least a range of from −40° C. to 85° C. without suffering significant mechanical and/or optical performance degradation.

Heat shrink protection sleeves are commonly used as packaging to protect one or more spliced optical fibers. Such a sleeve typically includes an outer heat shrink tube (typically made of a heat shrinkable material (e.g., a polyolefin) and/or a non-stick material (e.g., polytetrafluoroethylene (PTFE)), an inner thermoplastic tube typically made of a melt flow adhesive material (e.g., ethylene vinyl acetate (EVA)), optionally in combination with a rigid (e.g., stainless steel) rod serving as a splint. When heated in an oven (e.g., associated with a fusion splicing tool), the thermoplastic tube melts and is compressed around the fiber and the rigid rod by the heat shrink tube, forming a hermetic seal around the fusion splice region.

An exemplary heat shrink protection sleeve 30 used to protect a splice joint 32 formed between two coated optical fibers 10A, 10B is schematically illustrated in FIGS. 2A and 2B. The heat shrink protection sleeve 30 includes a generally cylindrical inner tube 34 (e.g., a melt flow adhesive material such as ethylene vinyl acetate (EVA)) and a generally cylindrical outer tube 36 (e.g., a polyolefin and/or PTFE), wherein the outer tube 36 generally surrounds the inner tube 34, and the inner tube 34 defines an interior passage 40. Although not shown, the inner tube 34 may optionally include a rigid rod useable as a splint. The outer tube 36 is required for conventional heat shrink protection sleeves because the melt flow adhesive material (e.g., EVA) has a very high viscosity and a very low softening temperature (e.g., about 100° C.). The more temperature-resistant outer tube 36 is typically considered indispensable, particularly when the splice is intended for operation over a high temperature range of up to about 85° C. In use, the heat shrink protection sleeve 30 is positioned over a fusion spliced section of two optical fibers 10A, 10B. The fusion spliced section includes the splice joint 32 arranged between (stripped) glass cladding segments 14A, 14B of the respective optical fibers 10A, 10B. Upon application of heat (typically within an oven), the inner tube 34 melts around the optical fibers 10A, 10B, the glass cladding segments 14A, 14B, and the splice joint 32. The outer tube 36, which includes a cylindrical outer surface 38, may include some heat shrinking capability to help the adhesive distribute around the fused optical fibers 10A, 10B.

Groups of coated optical fibers (e.g., 4, 8, 12, or 24 optical fibers) may be held together using a matrix material, intermittent inter-fiber binders ("spiderwebs"), or tape to form "optical fiber ribbons" or "ribbonized optical fibers" to facilitate packaging within cables. For example, optical fiber ribbons are widely used in cables for high capacity transmission systems. Some modern cables in large-scale data centers or fiber-to-the-home networks may contain up to 3,456 optical fibers, and cables having even higher optical fiber counts are under development. Optical fibers that form a ribbon are arranged in parallel in a linear (i.e., one-dimensional) array, with each fiber having a different color for ease of identification. FIG. 3 provides a cross-sectional view of a multi-fiber ribbon 42, which includes twelve optical fibers 44A-44L and a matrix 46 encapsulating the optical fibers 44A-44L. The optical fibers 44A-44L may be substantially aligned with one another in a generally parallel configuration. Although twelve optical fibers 44A-44L are shown in the multi-fiber ribbon 42, it is to be appreciated that any suitable number of multiple fibers (but preferably at least four fibers) may be employed to form optical fiber ribbons suitable for a particular use.

Mass fusion splicing is a high throughput technology for interconnecting large number of fibers in a ribbon format. First and second segments of up to twelve fibers arranged in a linear array can be fusion spliced simultaneously by mass fusion splicing. Since sequential formation of twelve fusion splices using a traditional single fiber fusion splicing technique is very time consuming, the ability to fusion splice linearly arrayed segments of up to twelve fibers simultaneously enables entire ribbons to be spliced rapidly, thereby improving manufacturing throughput.

Heat shrink protection sleeves similar to those outlined above have also been applied to protect optical fiber ribbon splices, which include multiple fusion splices between first and second arrays of parallel optical fibers contained in first and second optical fiber ribbon segments, respectively. In such a context, an integrated strength member typically includes a flat surface to support the fusion spliced fiber arrays, a thermoplastic inner tube is melted around the spliced ribbon cables and the integrated strength member, and a more temperature-resistant outer tube encases the thermoplastic inner tube. The cross section of a typical ribbon splice protector is 4 mm×4.5 mm, and the length is about 40 mm. Such a splice protector is suitable for interfacing with optical fiber ribbons, but not jacketed cables since the cross-sectional width of a ribbon-type splice protector is much larger than that of a jacketed cable.

Conventional mass fusion splice technology, as well as conventional splice protection technology, only supports one-dimensional arrays of optical fiber splices. For splicing of fibers of small diameter round cables, it is necessary to ribbonize loose tube fibers or arrange rollable optical fiber ribbons in a one-dimensional array to permit mass fusion splicing, and the mass fusion spliced one-dimensional array of fibers is typically protected in a bulky heat shrink sleeve. FIG. 4 illustrates a conventional cable assembly 50 incorporating first and second loose tube-type cables 52A, 52B bearing pre-coated loose optical fibers 54A, 54B, with stripped sections thereof that are mass fusion spliced in a one-dimensional array in a fusion splice region 56 that is protected by a conventional ribbon splice protector 60. The ribbon splice protector 60 includes an outer heat shrink member 64 and an inner thermoplastic member 62 that surrounds the fusion splice region 56 as well as stripped sections (not shown) of the first and second loose optical fibers 54A, 54B. As shown in FIG. 4, the ribbon splice protector 60 has a much larger diameter or width than a diameter or width of each of the first and second loose tube-type cables 52A, 52B.

In view of the foregoing, need remains in the art for cable assemblies with intra-connector splices, and improved splice protectors, that address the above-described and other limitations associated with conventional cable assemblies and splice protectors, as well as associated fabrication methods.

SUMMARY OF THE DISCLOSURE

The present disclosure relates to protecting splices of multiple optical fibers with a low-profile multi-fiber splice protector and a compact splice on furcation housing. The present disclosure also relates to optimal fiber wiring patterns within an optical fiber cable assembly.

In one embodiment, a fiber optic cable assembly is provided. The fiber optic cable assembly comprising: a splice assembly including: a first fiber optic cable section comprising a first plurality of optical fibers, and a second fiber optic cable section comprising a second plurality of optical fibers, wherein the first fiber optic cable section comprises a plurality of pigtail cables and wherein the second fiber optic cable section comprises a jacket, and wherein a portion of the jacket is split to form a split jacket section; a plurality of splice joints joining ends of the first plurality of optical fibers with ends of the second plurality of optical fibers to form a plurality of fusion spliced optical fibers; and a splice protector applied onto the plurality of splice joints; a furcation assembly applied onto the splice assembly, the furcation assembly including: a furcation housing having a length, wherein the furcation housing covers a portion of the splice protector; and a boot coupled to the furcation housing, wherein the boot covers a remainder of the splice protector that protrudes from the furcation housing.

In another embodiment, the splice protector protrudes from an end of the furcation housing by less than 3 mm. In another embodiment, the boot has a head portion and a tail portion, wherein the head portion covers the remainder of the splice protector that protrudes from the furcation housing. In another embodiment, the tail portion covers the split jacket section of the jacket. In another embodiment, the splice protector has a length less than 30 mm. In another embodiment, a length between the pigtail cables and an end of the splice protector is less than 25 mm. In another embodiment, the furcation assembly has a length between 40 mm and 80 mm.

In one embodiment a method of assembling a fiber optic cable assembly, wherein the fiber optic cable assembly includes a first fiber optic cable section comprising a first plurality of optical fibers, and a second fiber optic cable section comprising a second plurality of optical fibers, wherein the first fiber optic cable section comprises a plurality of pigtail cables and wherein the second fiber optic cable section comprises a jacket, and wherein a portion of the jacket is split to form a split jacket section is provided. The method comprising: splicing ends of the first plurality of optical fibers to the second plurality of optical fibers to form a plurality of splice joints; applying a splice protector to cover the plurality of splice joints; arranging a furcation housing to cover a portion of the pigtail cables and a portion of the splice protector; and coupling a boot onto an end of the furcation housing.

In another embodiment, the splice protector protrudes from an end of the furcation housing by less than 3 mm. In another embodiment, the boot has a head portion and a tail portion, wherein the head portion covers the remainder of the splice protector that protrudes from the furcation housing. In another embodiment, the tail portion covers the split jacket section of the jacket. In another embodiment, the method further comprising: assigning a sequential number to a plurality of optical fibers; pairing each of the plurality of optical fibers to form a first set and second set of optical fiber pairs; wherein the first set of optical fiber pairs comprise odd optical fiber pairs and the second set of optical fiber pairs comprise even optical fiber pairs; arranging the first set of optical fiber pairs and the second set of optical fiber pairs in an alternating arrangement; and ribbonizing the alternating arrangement to form an optical fiber ribbon.

In one embodiment, a fiber optic harness is provided. The fiber optic harness comprising: a splice assembly including: a first fiber optic cable section comprising a first plurality of optical fibers, and a second fiber optic cable section comprising a second plurality of optical fibers, wherein the first fiber optic cable section comprises a plurality of pigtail cables and wherein the second fiber optic cable section comprises a multi-fiber cable including a jacket, and wherein a portion of the jacket is split to form a split jacket section; a plurality of splice joints joining ends of the first plurality of optical fibers with ends of the second plurality of optical fibers to form a plurality of fusion spliced optical fibers; and a splice protector applied onto the plurality of splice joints; a furcation assembly applied onto the splice assembly, the furcation assembly including: a furcation housing having a length, wherein the furcation housing covers a portion of the splice protector; and a boot coupled to the furcation housing, wherein the boot covers a remainder of the splice protector that protrudes from the furcation housing; a plurality of first connectors individually coupled to the plurality of pigtail cables; and a second connector coupled to the multi-fiber cable.

In another embodiment, the splice protector protrudes from an end of the furcation housing by less than 3 mm. In another embodiment, the boot has a head portion and a tail portion, wherein the head portion covers the remainder of the splice protector that protrudes from the furcation housing. In another embodiment, the tail portion covers the split jacket section of the jacket. In another embodiment, the splice protector has a length less than 30 mm. In another embodiment, a length between the pigtail cables and an end of the splice protector is less than 25 mm.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
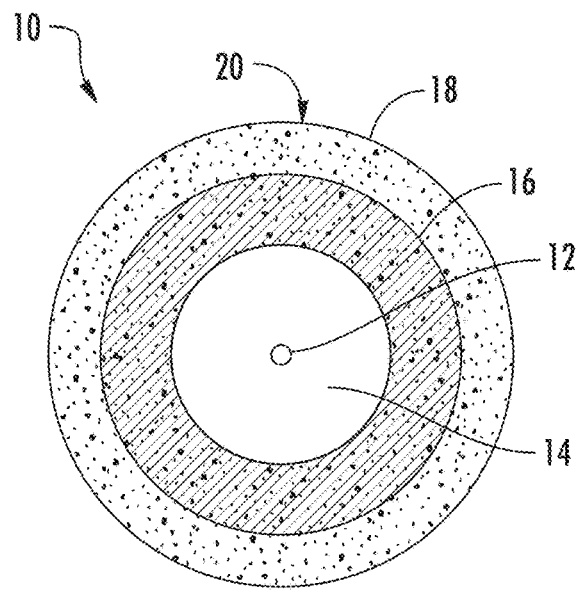
FIG. 1 is a cross-sectional view of a conventional coated optical fiber that may be subject to fusion splicing, prior to stripping of a multi-layer polymer coating from glass cladding.
Figure 2A:
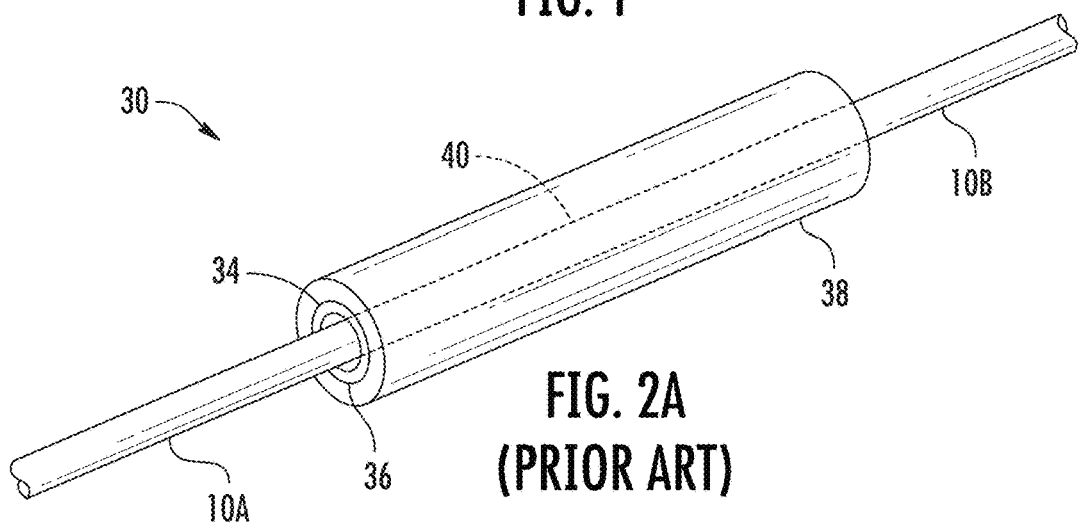
FIG. 2A is a schematic perspective view of a conventional heat shrink protection sleeve used to protect a splice joint between two optical fibers.
Figure 2B:
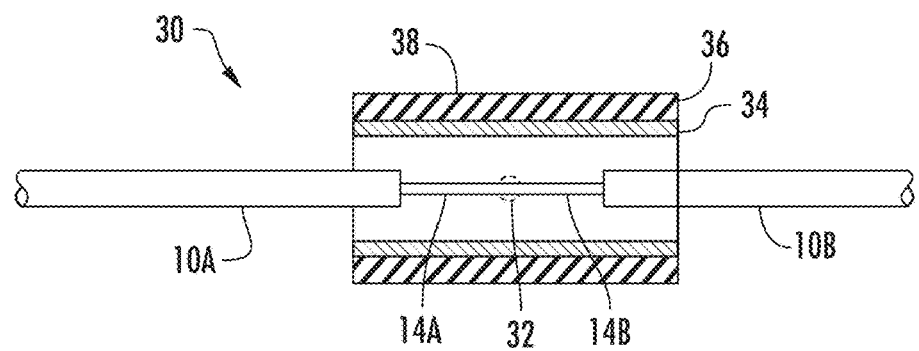
FIG. 2B is a schematic cross-sectional view of the heat shrink protection sleeve and optical fibers of FIG. 2A, with schematic illustration of the splice joint between stripped portions of the two optical fibers.
Figure 3:
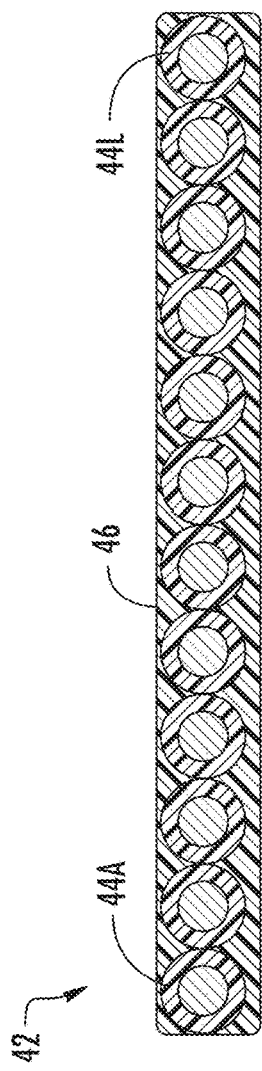
FIG. 3 is a cross-sectional view of a conventional optical fiber ribbon including twelve optical fibers.
Figure 4:
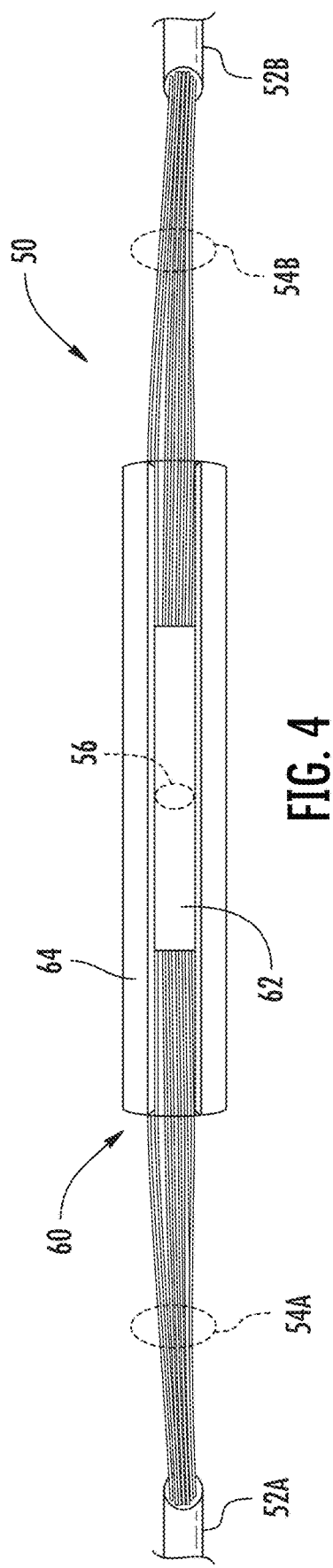
FIG. 4 is a cross-sectional view of a conventional cable assembly incorporating a ribbon splice protector used to protect splice joints between two groups of optical fibers.
Figure 5:
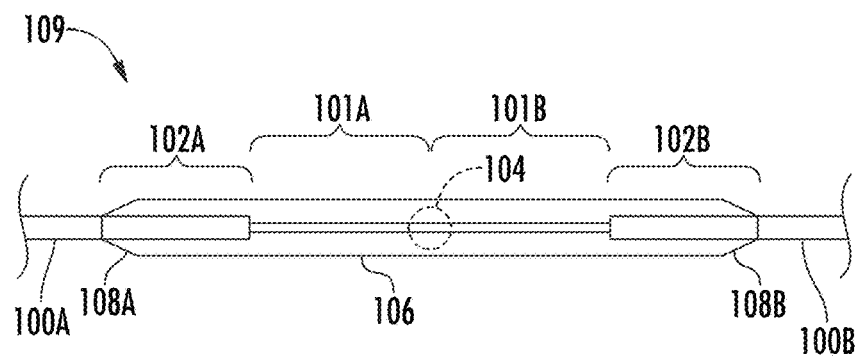
FIG. 5 is a schematic side view illustration of a fusion spliced section of optical fibers including a solid overcoating of thermoplastic material arranged over stripped sections of the first and second optical fibers, a splice joint, and pre-coated sections of the first and second optical fibers.

Various embodiments will be clarified by examples in the description below. In general, the present disclosure relates to protecting splices of multiple optical fibers with a low-profile multi-fiber splice protector and a compact splice on furcation housing. The present disclosure also relates to optimal fiber wiring patterns within an optical fiber cable assembly.

In this disclosure, the language "fusion spliced optical fiber" refers to two optical fibers that have been fusion spliced together to form a permanent, optical link incorporating the two optical fibers. The singular noun "fusion spliced optical fiber" is used even though two optical fibers are initially present because, after fusion splicing, the resulting optical link is intended to function like a continuous optical fiber (even though there may be some attenuation resulting from the fusion splice joint). Using the singular form also facilitates discussions involving groups of these fusion spliced optical fibers, as will be apparent. A fusion spliced optical fiber may desirably include a polymeric overcoating over the fusion splice joint as well as over stripped portions of optical fibers proximate to the fusion splice joint.

Likewise, in this disclosure, the two optical fibers that define a given "fusion spliced optical fiber" may alternatively be referred to as "optical fiber segments." Using the language "optical fiber segments" rather than "optical fibers" helps clarify when the disclosure is referring to one of the pairs of optical fibers that form one of the fusion spliced optical fibers, versus one of the fusion spliced optical fibers itself.

In certain embodiments, after fusion splicing, portions of the fusion spliced optical fibers proximate to a splice region may be coated (e.g., ribbonized) with thermoplastic hotmelt material (e.g., to any desired overall thickness, such as 0.1 mm to 0.35 mm). Prior to insertion of fusion spliced optical fibers into a splice protector, portions of the thermoplastic hotmelt material forming the ribbon matrix material may be at least partially delaminated (e.g., by heating or peeling), leaving a short length (e.g., less than 3 mm, or less than 2 mm) of ribbon matrix holding individual fusion spliced optical fibers together proximate to a splice region.

In certain embodiments, the following steps may be performed prior to sequential insertion of fusion spliced optical fibers through the longitudinal opening of a strength member into an internal cavity thereof: ribbonizing a first plurality of optical fibers emanating from a first fiber optic cable section using the thermoplastic hotmelt material to form a first ribbon matrix, wherein each optical fiber of the first plurality of optical fibers includes a pre-coated section and a stripped section; ribbonizing a second plurality of optical fibers emanating from a second fiber optic cable section using the thermoplastic hotmelt material to form a second ribbon matrix, wherein each optical fiber of the second plurality of optical fibers includes a pre-coated section and a stripped section; mass fusion splicing ends of the stripped sections of the first plurality of optical fibers with ends of the stripped sections of the second plurality of optical fibers to form the plurality of fusion spliced optical fibers; delaminating a portion of the first ribbon matrix proximate to transitions between the pre-coated sections and the stripped sections of the first plurality of optical fibers; and delaminating a portion of the second ribbon matrix proximate to transitions between the pre-coated sections and the stripped sections of the second plurality of optical fibers.

In certain embodiments, a strength member of a splice protector has a length at least as long as the total length of stripped sections of optical fiber segments to be spliced. For mass fusion spliced optical fibers, the total length of a splice protector may be as short as about 20 mm. For individually spliced fibers, the total length of a splice protector may be as short as about 10 mm. While a short splice protector is desired to minimize the rigid length in a spliced cable, a longer splice protector improves the tensile strength of the protected splices. In certain embodiments, a protected splice may have a tensile strength of at least 20 lbf, or in a range of 20 lbf to 40 lbf. Length, thickness, and material composition of a strength member can be optimized to confer a desired degree of bend resistance to a multi-fiber splice protector. One method for evaluating bend resistance of a multi-fiber splice protector as described herein is with a three point bending model, assuming that ends of the splice protector are supported (e.g., from below) and a force is applied to the middle of the multi-fiber splice protector in a direction (e.g., downward direction) opposing the support.

In certain embodiments, a fiber optic cable assembly includes a plurality of fusion spliced optical fibers, with each spliced optical fiber including two optical fiber segments that are arranged serially and joined together by a splice (e.g., a fusion splice) to define a fusion splice joint. The fusion splice joints of the plurality of fusion spliced optical fibers define a fusion splice region of the fiber optic cable assembly. The fiber optic cable assembly may include a polymeric overcoating, in which polymeric material beneficially overcoats or encapsulates the fusion splice region and stripped sections of the optical fibers. The polymeric material may include or consist of a thermoplastic hotmelt material. In certain embodiments, the maximum width and height dimensions of the polymeric material are only slightly larger than maximum width and height dimensions of an array of pre-coated sections of the optical fibers proximate to the stripped sections.

Figure 6:
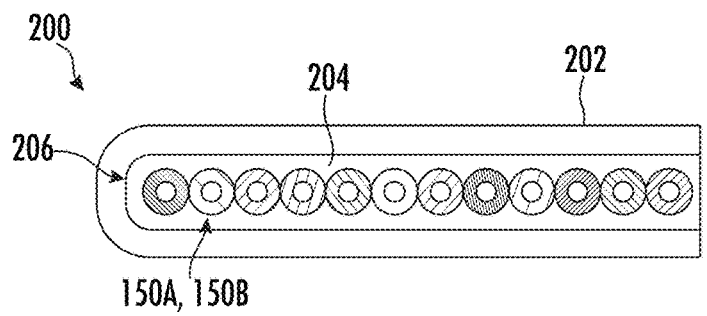
FIG. 6 illustrates a cross-sectional view of a low profile splice protector.

FIG. 6 is a schematic side view of an overcoated fusion spliced section 109 of optical fibers 100A, 100B, wherein a solid overcoating 106 of thermoplastic material has a substantially constant outer diameter over the majority of its length. Each optical fiber 100A, 100B includes a coating, with portions of each optical fiber 100A, 100B being previously stripped of such coating to form stripped sections 101A, 101B embodying glass cladding. Ends of the stripped sections 101A, 101B are fusion spliced to form a splice joint 104. As shown, the solid overcoating 106 of thermoplastic material extends over the splice joint 104, the previously stripped sections 101A, 101B, and short (previously unstripped) lengths 102A, 102B of the optical fibers 100A, 100B. The solid overcoating 106 may optionally include tapered thickness ends 108A, 108B as depicted in FIG. 6, and a central section having a substantially constant outer diameter that exceeds an outer diameter of unstripped portions of the optical fibers 100A, 100B. As mentioned above, the coated optical fibers 50A, 50B may each have a nominal outer diameter of 0.25 mm (250 µm) in some embodiments. In certain embodiments, the solid overcoating 106 may have a diameter or thickness that is substantially equal to a diameter or thickness of the unstripped portions of the optical fibers 100A, 100B.

Although only a single overcoated fusion spliced optical fiber section 109 is shown in FIG. 6, it is to be appreciated that a solid overcoating similar to the solid overcoating 106 shown in FIG. 6 may be applied to multiple fusion spliced optical fibers arranged in a one-dimensional array. In such a situation, the above-described outer diameter values for solid overcoating of thermoplastic hotmelt material may correspond to thickness values for the solid overcoating applied to an array of fusion spliced optical fibers.

A thermoplastic hotmelt material useable to overcoat fusion spliced optical fibers comprises a thermoplastic material that may be heated to a flowable state. In certain embodiments, fusion spliced optical fibers may be temporarily placed in a cavity (e.g., a mold cavity), a housing, a trough, or a container in which thermoplastic hotmelt material in a flowable state is present, or to which such thermoplastic hotmelt material in a flowable state is supplied. In certain embodiments, fusion spliced optical fibers may be dipped into (or otherwise contacted with) a pool of molten thermoplastic material to effectuate coating. In certain embodiments, a polymeric material that may be used to overcoat portions of fusion spliced optical fibers may include a melt-flow thermoplastic adhesive material. Examples of thermoplastic hotmelt materials that may be used in certain embodiments include, but are not limited to ethylene vinyl acetate (EVA), polyurethanes, and polyamides.

To avoid thermal degradation of one or more acrylate coating layers of the pre-coated sections of the fusion spliced optical fibers, molten thermoplastic material to be used for overcoating should be maintained at a processing temperature below a melt temperature of the one or more acrylate coating layers. To promote formation of a suitable overcoating, the molten thermoplastic material may also be maintained at a processing temperature at which the molten thermoplastic material has a melt viscosity in a range of from about 100 centipoises (cps) to about 10,000 cps, or more preferably in a subrange of from about 1,000 cps to about 10,000 cps, or more preferably in a subrange of from about 2,000 cps to about 4,000 cps.

In certain embodiments, desirable thermoplastic hotmelt and/or overcoating materials differ from conventional meltflow adhesive glue sticks or typical thermoplastic materials in that they desirably: have a medium viscosity (e.g., according to one or more of the ranges outlined above) at a processing temperature; are chemically stable at the processing temperature, have a glass transition temperature of no greater than −40° C.; have a service temperature spanning at least a range of from −40° C. to 85° C. without suffering significant mechanical and/or optical performance degradation; exhibit strong adhesion to fiber coating layers and bare glass; are free from charring; and/or exhibit minimal to no outgassing (e.g., of volatile organic compounds and/or other constituents). A glass transition temperature is the point at which a material goes from a hard brittle state to a flexible or soft rubbery state as temperature is increased. A common method for determining glass transition temperature uses the energy release on heating in differential scanning calorimetry. If a plastic (e.g., thermoplastic) material associated with an optical fiber is exposed to a temperature below its glass transition temperature, then the material will become very hard, and the optical fiber may be susceptible to micro bend losses. In certain embodiments, service temperature of a thermoplastic overcoating material may be determined by compliance with one or more industry standards for telecommunication fiber reliability testing, such as (but not limited to): ITU-T G.652, IED60793-2, Telcordia GR-20-CORE and TIA/EIA-492.

In certain embodiments, a thermoplastic hotmelt material and/or a thermoplastic overcoating useable with embodiments disclosed herein has a heat resistance temperature of at least 100° C., a melting temperature of less than 240° C., and a melt viscosity of less than 10,000 cps. In certain embodiments, a thermoplastic hotmelt material may comprise a melt-flow thermoplastic adhesive material, such as TECHNOMELT® PA 6208 polyamide material (Henkel Corp., Dusseldorf, Germany). Such material exhibits a heat resistance temperature greater than 90° C., a melt-flow temperature lower than 260° C., a melt viscosity between 100 cps and 10,000 cps, and a hardness of at least Shore A 45. In certain embodiments, a thermoplastic hotmelt material useable with multi-fiber splice protectors disclosed herein may include PA682 hotmelt adhesive commercially available from Henkel Corp. Further details regarding thermoplastic overcoating of fusion spliced optical fibers and/or portions of fiber optic cable assemblies are disclosed in U.S. Patent Application Publication No. 2020/0012047A1 published on Jan. 9, 2020, wherein the content of the foregoing publication is hereby incorporated by reference herein.

Formation of a solid thermoplastic overcoating over at least a short distance of pre-coated sections of optical fibers bounding a spliced segment (e.g., at either end of stripped sections joined at a splice joint) beneficially ensures that all previously stripped (glass) sections are fully overcoated. In certain embodiments, a solid thermoplastic overcoating extends over a length of a pre-coated section of each of the first and second optical fibers, wherein the overcoated length of each pre-coated section is in a range of from about 1 mm to about 10 mm. Additionally, since the solid thermoplastic overcoating may adhere to one or more coating layers of an optical fiber more readily than to (pre-stripped) exposed glass sections, providing a solid thermoplastic overcoating of sufficient length to overlap at least a short distance of pre-coated sections of optical fibers bounding a spliced segment promotes more secure adhesion between the solid thermoplastic overcoating and the fusion spliced segment as a whole. In certain embodiments, a solid thermoplastic overcoating and a fusion spliced segment utilize a thermoplastic material that is devoid of additives configured to promote adhesion to glass, such as silane.

In preferred embodiments, a solid thermoplastic overcoating is water-resistant and serves to block moisture from reaching the splice joint and the previously stripped glass region of a fusion spliced segment of optical fibers. This is beneficial since moisture is known to chemically interact with glass cladding of optical fibers and cause expansion of micro defects in the glass, thereby leading to long-term failure of optical fibers. The solid thermoplastic overcoating is preferably also devoid of sharp particles (e.g., inorganic filler particles) and air bubbles. The solid thermoplastic overcoating may also be devoid of a UV curable material. In certain embodiments, formation of air bubbles may be reduced by contacting stripped sections and pre-coated sections of fusion spliced first and second optical fibers with molten thermoplastic material in a subatmospheric pressure environment (e.g., in a range of from 0.01 to 0.9, or 0.1 to 0.8, or 0.1 to 0.7 times local atmospheric pressure), such as may be attained in a partially evacuated chamber or other enclosure.

In certain embodiments, portions of fusion spliced optical fibers may be overcoated with thermoplastic hotmelt material prior to insertion of the optical fibers into a strength member (i.e., through a longitudinal opening of the strength member into an internal cavity thereof). This initial overcoating may effectively ribbonize (or re-ribbonize) previously stripped portions of multiple fusion spliced optical fibers, thereby aiding in handling the optical fibers prior to and during insertion into a strength member. The initial overcoating may also prevent the potential formation of voids within the internal cavity of a strength member, depending on factors such as the amount and condition of thermoplastic hotmelt material present within the internal cavity and/or the manipulation of fusion spliced optical fibers during insertion into the internal cavity.

In certain embodiments, the thermoplastic hotmelt material with which the fusion spliced optical fibers are overcoated is compositionally the same as (or substantially similar to) thermoplastic hotmelt material initially present within the internal cavity of the strength member (i.e., prior to insertion of optical fibers through the longitudinal opening). Compositional matching between the overcoating material and the thermoplastic hotmelt material initially present within the internal cavity permits the respective materials (upon heating) to assimilate without a dissimilar material boundary after fusion spliced optical fibers are inserted through a longitudinal opening into the internal cavity of a strength member to form a cable assembly including a multi-fiber splice protector.

In certain embodiments, pre-coated (i.e., acrylate coated) optical fibers subject to being fusion bonded and overcoated (or encapsulated) according to methods disclosed herein are prepared for fusion bonding (e.g., by stripping ends thereof) utilizing non-contact fiber stripping methods and/or apparatuses, such as those disclosed in U.S. Pat. No. 9,167,626 B2 ("the '626 Patent"), which is hereby incorporated by reference. Briefly, the '626 Patent discloses use of a heater configured for heating a heating region to a temperature above a thermal decomposition temperature of at least one coating of an optical fiber, a securing mechanism for securely positioning a lengthwise section of the optical fiber in the heating region, and a controller operatively associated with the heater and configured to deactivate the heater no later than immediately after removal of the at least one coating from the optical fiber. Thermal decomposition of at least one coating of an optical fiber reduces or minimizes formation of flaws in optical fibers that may be generated by mechanical stripping methods and that can reduce their tensile strength.

In certain embodiments, unjacketed optical fiber segments emanating from the same jacket may be initially loose, but subsequently ribbonized to provide consistent spacing between fibers to facilitate utilization of a mass fusion splicing process for forming multiple splice joints between multiple pairs of optical fibers in a substantially simultaneous manner. To fabricate an optical fiber ribbon, optical fibers of an unjacketed segment may be contacted with at least one polymeric material (e.g., thermoplastic hotmelt material) in a flowable state, and the at least one polymeric material may be solidified. When optical fiber ribbons are used, mass fusion splicing may be performed between ends of optical fibers of a first optical fiber ribbon and ends of optical fibers of a second optical fiber ribbon.

Optical fibers of a first plurality of optical fiber segments and of a second plurality of optical fiber segments to be fusion bonded may be arranged in first and second conventional fiber sorting fixtures, respectively, during stripping and/or fusion bonding steps. A typical fiber sorting fixture includes a slot having an opening dimension (e.g., height) that closely matches a corresponding dimension of unbuffered, coated optical fibers to maintain portions of the optical fibers proximate to ends to be stripped (and subsequently fusion spliced) in fixed, substantially parallel positions embodying a one-dimensional array. In certain embodiments, coated optical fibers having outer diameters of either 200 μm or 250 μm may laterally abut one another in a fiber sorting fixture, such that cores of adjacent optical fibers are also spaced either 200 μm or 250 μm apart. After stripping of acrylate coating material from end sections (to form stripped sections) of the optical fibers, the remaining (bare glass) cladding and core portions are in a non-contacting (and non-crossing) relationship, and bare glass ends of the optical fibers may be fusion bonded using conventional fusion bonding method steps known to those skilled in the art. Mass fusion bonding may be used in any embodiments disclosed herein. Variations of the techniques disclosed in the '626 Patent are disclosed in U.S. Pat. Nos. 10,018,782 and 9,604,261, the disclosures of which are also hereby incorporated by reference herein. Non-contact stripping methods using lasers or hot gases are also possible in certain embodiments.

Figure 7A:
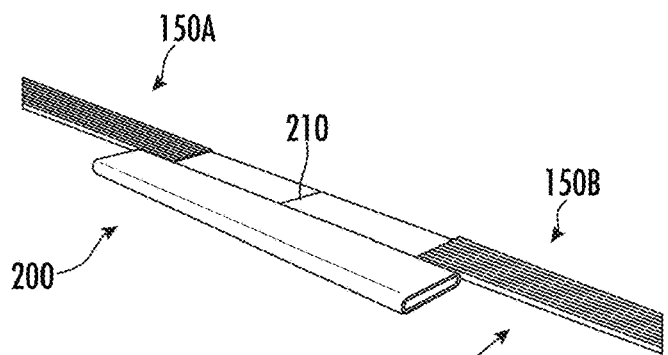
FIGS. 7A and 7B illustrate perspective views of a method of installing the low-profile splice protector onto spliced optical fibers.
Figure 7B:
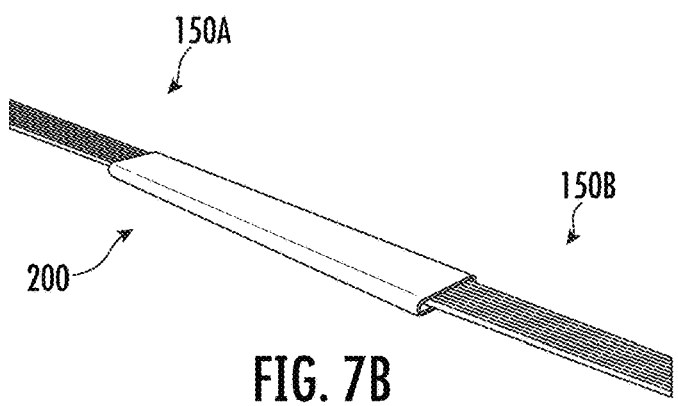

Referring now to FIG. 6, a splice protector 200 is shown. Splice protector 200 is a low-profile splice protector that comprises a U-shaped stainless-steel reinforcement shell 202 to protect the splice joint 104 (FIG. 7A) housed within the shell 202 along at least three sides of the splice joint 104. It is contemplated that in alternate embodiments, alternative shapes of splice protector 200 may be used to protect the splice joint 104 of optical fibers 100A, 100B of optical fiber ribbons 150A, 150B, respectively, along at least three sides of the splice joint 104. Splice protector 200 includes a thermoplastic material 106 within cavity 206 of splice protector 200 to encapsulate the splice joint 104, previously stripped bare fibers of optical fiber ribbons 150A, 150B, and portions of coated optical fiber ribbons 150A, 150B adjacent to the joints (FIGS. 7A and 7B). Additional relevant details regarding splice protector 200 of the present disclosure are disclosed in U.S. Patent Application Publication No. 2021/0302656, the disclosure of which is hereby incorporated by reference.

It is within the scope of the present disclosure that alternate embodiments of splice protector 200 may be used. Alternate embodiments and corresponding dimensions and characteristics of splice protector 200 are disclosed in U.S. Patent Application Ser. No. 63/107,015, the disclosure of which is hereby incorporated by reference.

As shown in FIGS. 7A and 7B, the installation of splice protector 200 onto the joints of optical fiber ribbons 150A, 150B requires sliding the splice protector 200 onto the splice joint 104 in direction A such that the thermoplastic material 204 within cavity 206 of splice protector 200 encapsulates the splice joint 210 and portions of optical fiber ribbons 150A, 150B. While a single splice protector 200 is shown in FIGS. 5-7B, it is within the scope of the present disclosure that multiple splice protectors 200 may be used to protect multiple splice joints 104 of multiple pairs of optical fiber ribbons that are positioned within a furcation assembly 300 discussed below. Splice protectors 200 are low profile and compact and therefore, occupy less area within the furcation assembly 300, which in turn, necessitates smaller furcation assemblies 300 and yield space efficient cable assemblies.

Figure 8:
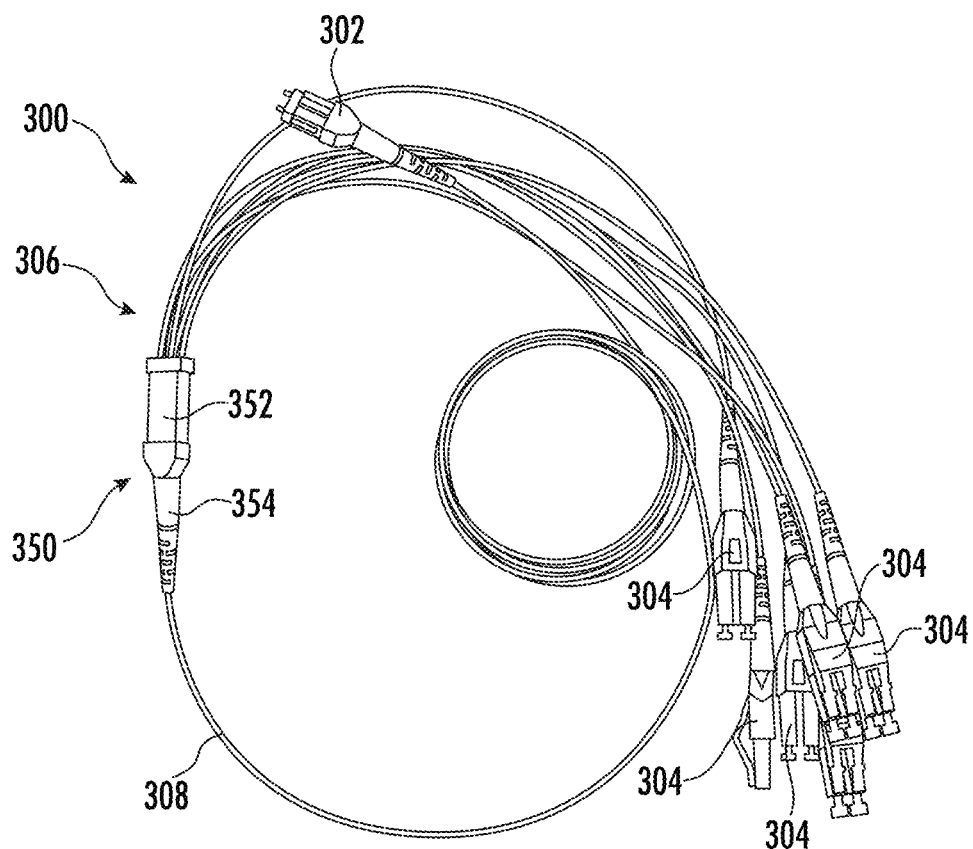
FIG. 8 is a perspective view of a harness connector assembly in accordance with the present disclosure.

Referring now to FIG. 8, a harness connector assembly 300 is shown. Harness connector assembly 300 includes a splice assembly 250 comprising spliced optical fiber ribbons 150A, 150B and splice protector 200 (as discussed above) where splice assembly 250 is coupled to a first connector 302 by a multi-fiber cable 308 and to a second connector 304 by a plurality of connector assemblies 306 (referred to herein as "pigtail assemblies" or "pigtails"). It is within the scope of the present disclosure that the above described configuration of splice assembly 250 is applicable in alternate suitable optical applications.

Harness connector assembly 300 also includes a furcation assembly 350 positioned over splice assembly 250. In some embodiments, first connector 302 is an MTP connector, and second connector 304 is an LC Uniboot connector. However, it is within the scope of the present disclosure that alternate suitable connectors may be used, such as LC duplex, Uniboot, or MDC and SN connectors, for example.

Figure 9:
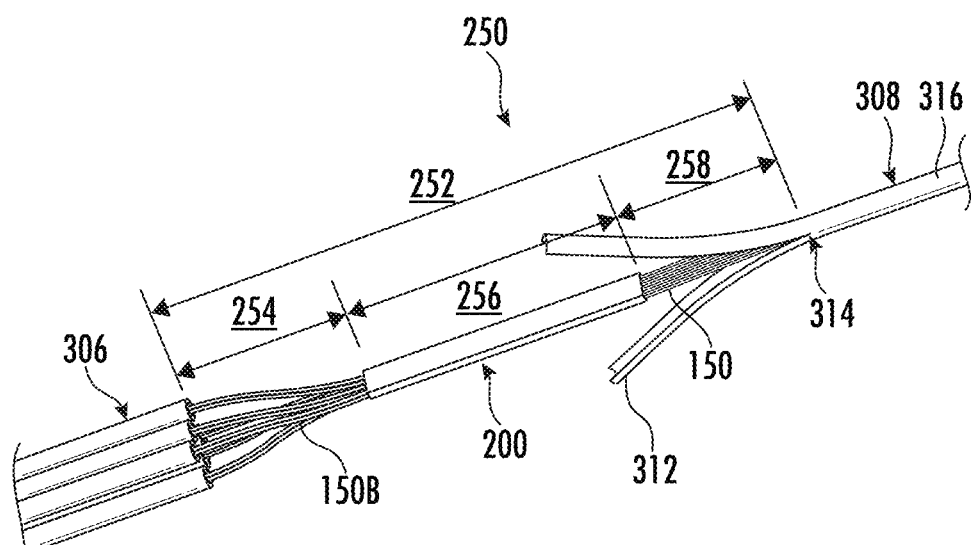
FIG. 9 is a perspective view of a mass fusion splice assembly ("splice assembly") of the harness connector assembly of FIG. 8.

As shown in FIG. 9 and as mentioned previously, splice assembly 250 comprises spliced optical fiber ribbons 150A, 150B with splice protector 200 protecting splice joint 104 (FIG. 7A). As shown, optical fiber ribbon 150A is housed within a multi-fiber cable 308 on one side of splice protector 200. Multi-fiber cable 308 is well known in the optical communications industry and includes a plurality of cable optical fibers such as optical fiber ribbon 150A surrounded by an outer protective sheath or jacket 310. The optical fibers or optical fiber ribbon 150A may be bare optical fibers, coated optical fibers (e.g., bare optical fibers covered by one or more acrylic coating layers), tight buffered optical fibers (e.g., coated optical fibers covered by thermoplastic material), or may be part of cable sub-assemblies or sub-units having an outer protective jacket. Additionally, the multi-fiber cable 308 or the individual cable sub-units may include strength members, such as a plurality of generally longitudinally extending aramid yarns (not shown). The multi-fiber cable 308 terminates at an end 312 ("first end 312" or "free end 312") at which furcation 352 (FIG. 13) is located.

Multi-fiber cable 308 also includes a cable jacket 316 and a slit 314 within cable jacket 316 allowing access to optical fiber ribbons 150A within multi-fiber cable 308 for mass fusion splicing as discussed above. In some embodiments, cable jacket 65 has a pair of slits 314 to open cable jacket 316 (by bending cable jacket 316) as shown in FIG. 9.

Optical fiber ribbon 150B on the other side of splice protector 200 is directed into pigtails 306. As discussed in greater detail below, optical fibers of optical fiber ribbon 150 can be routed in different ways into pigtails 306 such that the configuration reduces the macrobend loss applied harness cable assembly 300.

As also shown in FIG. 9, splice assembly 250 has a total length 252 that is configured to be housed within furcation assembly 350 discussed below. In some embodiments, total length 252 ranges between 40 mm and 80 mm, between 40 mm and 70 mm, or between 45 mm and 55 mm. Total length 252 comprises individual lengths 254, 256, and 256. Length 254 corresponds to the distance from an end of splice protector 200 to pigtails 306. In some embodiments, length 254 is less than 25 mm, less than 20 mm, or less than 15 mm. Length 256 corresponds to the length of splice protector 200. In some embodiments, length 256 is less than 30 mm, less than 27 mm, or less than 25 mm. Stated another way, length 256 of splice protector 200 is sufficient to cover a total stripped fiber length of about 20 mm, which is typical in mass fusion splicing applications. Length 258 corresponds to the distance from an end of splice protector 200 to the beginning of slit 314 of multi-fiber cable 308. In some embodiments, length 258 ranges between 5 mm and 30 mm, between 7 mm and 25 mm, or between 10 mm and 20 mm.

Figure 10:
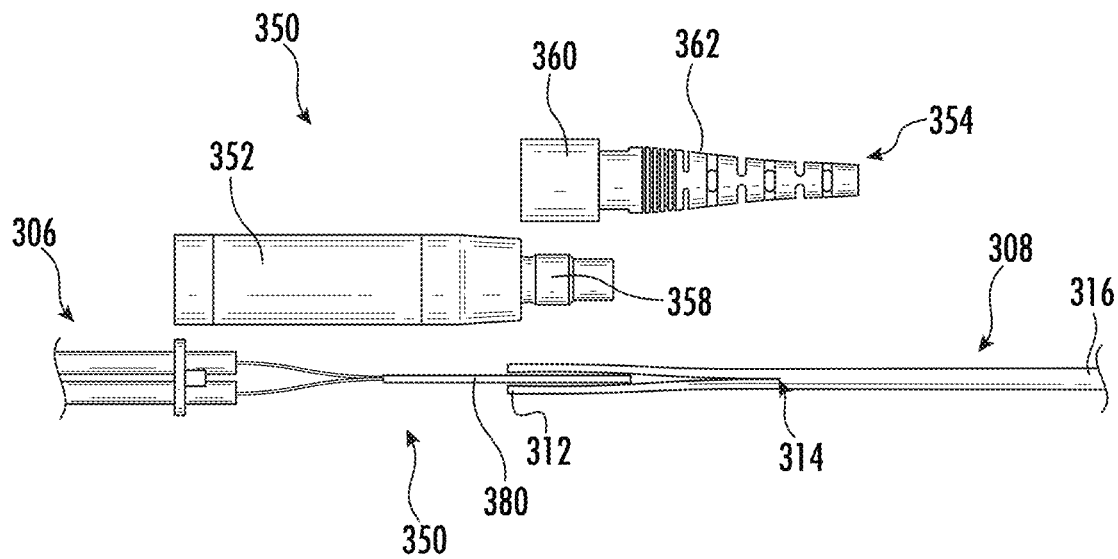
FIG. 10 is a side view of the splice assembly of FIG. 9 including a furcation assembly comprising a furcation housing and a boot to be applied onto the splice assembly.
Figure 11:
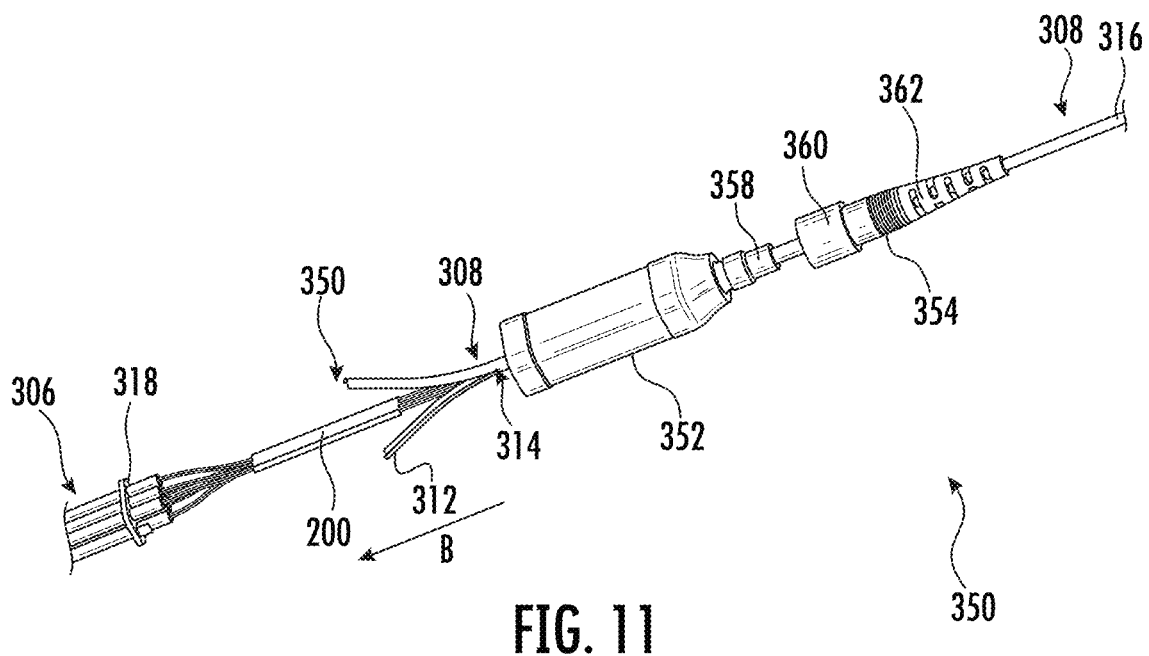
FIG. 11 is a perspective view of FIG. 10 where the furcation housing and the boot of the furcation assembly are applied onto the splice assembly of FIG. 9.

Referring now to FIGS. 10 and 11, a furcation assembly 350 is shown in the context of splice assembly 250. Furcation assembly is configured to protect splice assembly 250. Furcation assembly 350 comprises a furcation housing 352 and a boot 354.

Figure 12:
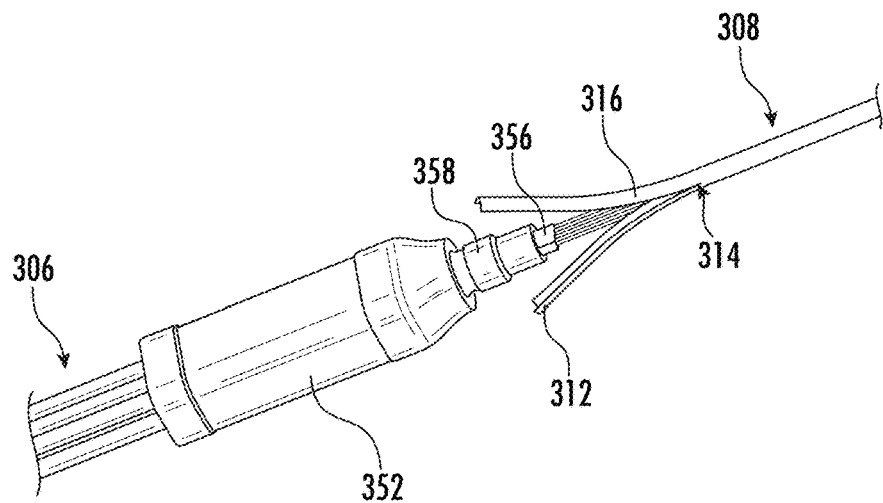
FIG. 12 is a perspective view of the splice assembly of FIG. 9 with the furcation housing positioned over splices and splice protector of the splice assembly.
Figure 13:
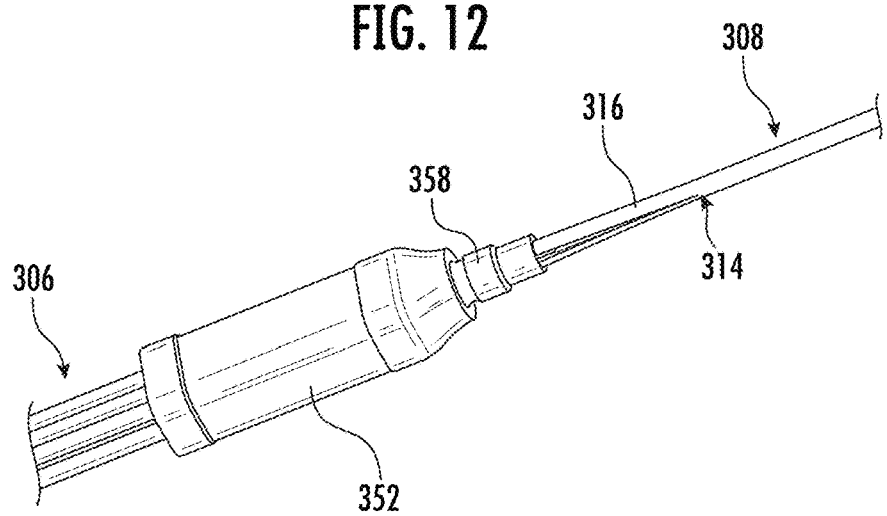
FIG. 13 is a perspective view of FIG. 12 where adhesive is injected to secure a cable jacket of the splice assembly to the furcation housing.

Furcation housing 352 is configured to cover at least a portion of splice protector 200. In particular, with reference to FIG. 12, when furcation housing 352 is applied onto splice assembly 250, furcation housing 352 partially covers splice protector 200 such that a portion 356 is left uncovered by furcation housing 352. In some embodiments, portion 356 beyond an end portion 358 of furcation housing 352 by less than 5 mm, less than 4 mm, or less than 3 mm. When applied, furcation housing 352 partially overlaps with cable jacket 316 and with pigtail cables 306 (contacting end cap 318). In some embodiments, furcation housing 352 is injected with potting adhesives (not shown) to affix optical fiber ribbon 150A within furcation housing 352 as shown in FIG. 13. In some embodiments, furcation housing 352 is a simple cylindrical housing with heat shrink tubings covering the multi-fiber cable jackets 308 on both ends of the splice joint 104. In some embodiments, other types of molding processes (e.g., low pressure molding or adhesive molding) may be used to form the outer profile of the furcation body.

Splice joint 104 within furcation housing 352 is independent of connector types used. In some embodiments, each optical fiber of optical fiber ribbon 150B exiting furcation housing 352 may be pre-terminated by a multi-fiber connector such as MTP, MPO, or expanded beam lens connectors. In some embodiments, each optical fiber of optical fiber ribbon 150B exiting furcation housing 352 may be a pre-furcated sub assembly with multiple simplex or duplex connectors. In some embodiments, each optical fiber of the optical fiber ribbons 150A, 150B may have a rectangular shape.

In splice joint 104 of furcation housing 352, the optical fibers used in multi-fiber cable 308 may be different from optical fibers exiting furcation housing 352. For instance, multi-fiber cable 308 may use a small diameter optical fiber such as a 200 µm diameter fiber to improve optical fiber density within furcation housing 352, while optical fibers exiting furcation housing 352 may be standard 250 µm fibers. In another embodiment, optical fibers in multi-fiber cable 308 may be SMF Ultra, and optical fibers in pigtails 306 may be LBL or ZBL fibers.

Figure 14:
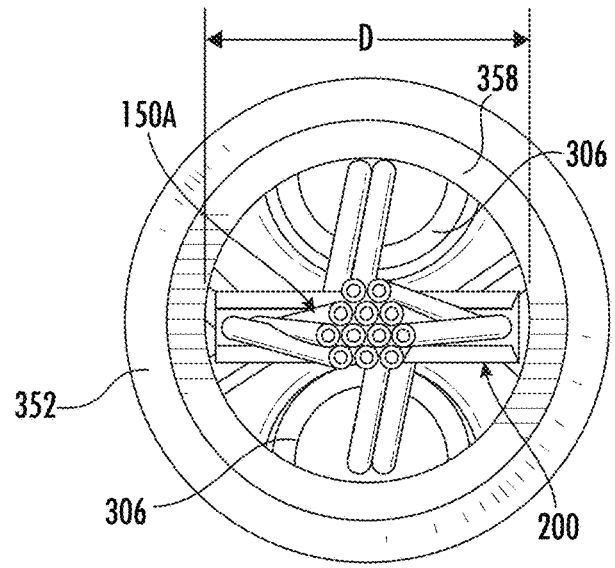
FIG. 14 is an end view of the furcation housing and the splice assembly.

Referring now to FIG. 14, an end view of furcation housing 352 is provided. As shown, optical fibers of optical fiber ribbon 150A extend into furcation housing 352 through end 358, and splice protector 200 is within furcation housing 352. As shown, end 358 has an inner diameter D that is configured to receive optical fiber ribbon 150A and splice protector 200. In some embodiments, end 358 has inner diameter D ranging between 3.2 mm and 5 mm or between 3.2 mm and 4 mm. In some embodiments, end 358 has an inner diameter D of about 3.3 mm. In addition, FIG. 14 shows routing of optical fibers of optical fiber ribbon 150B into pigtails 306 as discussed in greater detail below.

Referring back to FIGS. 10 and 11, boot 354 is provided in addition to furcation housing 352 to form furcation assembly 350. As shown, boot 354 couples to furcation housing 352 to form furcation assembly 350. In particular, boot 354 includes a head portion 360 that and a tail portion 362 that covers slit 314. Head portion 360 of boot 354 couples to end portion 358 of furcation housing 352 and covers portion 356 of splice protector 200 that protrudes beyond end portion 358 of furcation housing 352. Tail portion 362 of boot 354 covers slit 314 to conceal slit 314 within boot 354.

Figure 15:
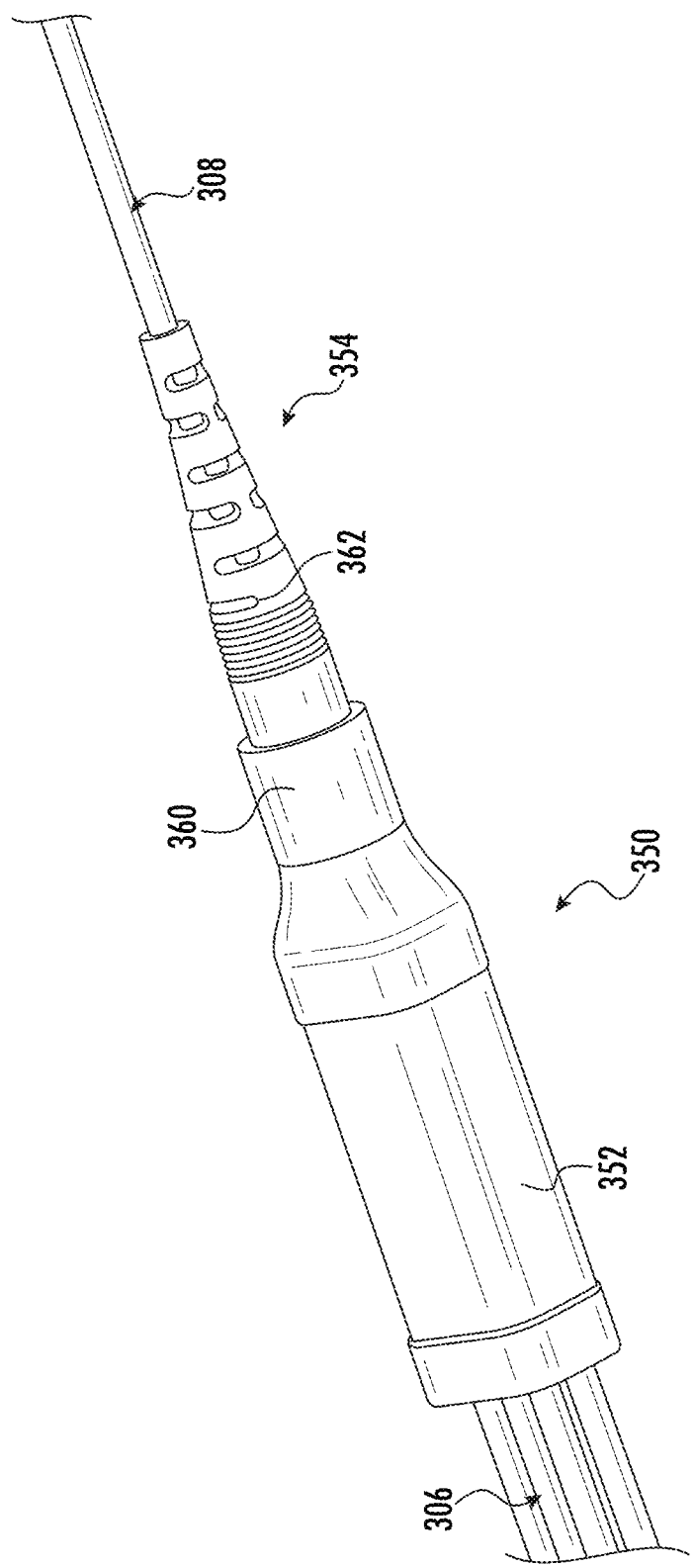
FIG. 15 is a perspective view of the mass fusion splice furcation assembly with the furcation housing and the boot installed onto the splice assembly.

To apply furcation housing 350 onto splice assembly 250 and harness connector assembly 300, furcation housing 352 and boot 354 are applied onto multi-fiber jacket 308 and slid along direction B toward splice assembly 250. In particular, furcation housing 352 is slid onto splice assembly 250 such that portion 356 of splice protector protrudes beyond end portion 358 of furcation housing 352 as shown in FIG. 13. Then, boot 354 is slid along direction B to couple head portion 360 onto end portion 358 (of furcation housing 352) and to cover slit 314 with tail portion 362 of boot 354 resulting in the assembled configuration shown in FIG. 15. The assembled configuration of furcation assembly 350 has similar mechanical performance as a standard furcation that can be applied upstream on multi-fiber cable 308. In addition, the assembled configuration of furcation assembly 350 has a length 252 that is less than a length of a standard furcation made from direct furcation and termination. The compact design of furcation assembly 350 provides said mechanical performance without incurring macrobend loss as discussed below.

Figure 16:
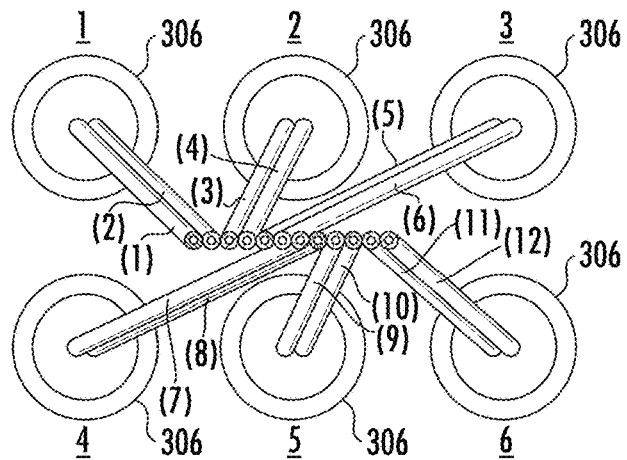
FIGS. 16-18 illustrate optimized ribbonizing sequences for the harness connector assembly.
Figure 17:
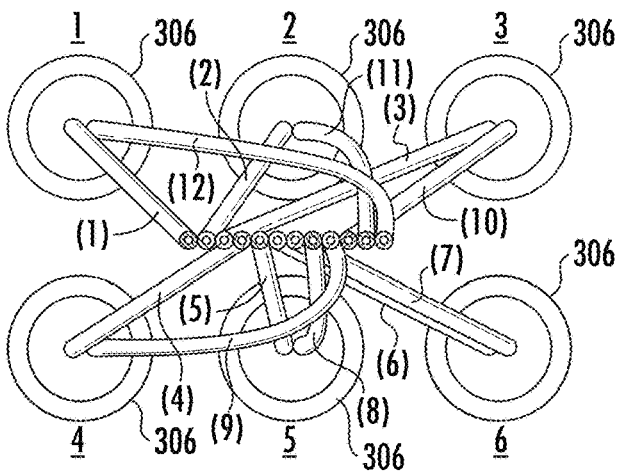
Figure 18:
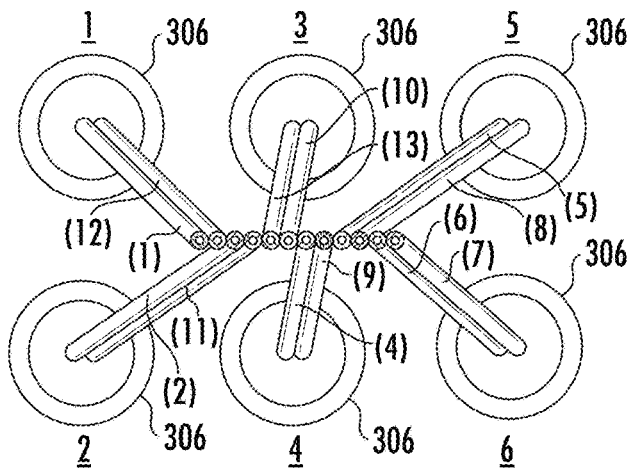

Referring now to FIGS. 16-18, various optical fiber wiring patterns into pigtails 306 are shown where pigtails 306 lead to a duplex connector such as second connector 304. The pattern shown in FIG. 17 is disclosed in greater detail in U.S. Pat. No. 6,869,227, the disclosure of which is hereby incorporated by reference.

Referring now to FIG. 18, an optimal wiring pattern of optical fibers of optical fiber ribbon 150B is shown. As shown, optical fibers of optical fiber ribbon 150B are rearranged downstream of splice protector such that a fixed pattern of optical fibers results having minimal lateral offset. In some embodiments, a maximum lateral offset is about 2.2 mm among optical fibers (1)-(4) and optical fibers (9)-(12). In some embodiments, the pattern of FIG. 18 reduces lateral offset by half. The wiring for polarity occurs in the multi-fiber cable end where the fiber offset is much smaller. As shown in FIG. 18, optical fibers (1)-(12) are rearranged in a ribbon where a first set of alternating optical fibers are in an ascending order (i.e., optical fibers (1)-(6)) and a second set of alternating optical fibers are adjacent to the first set and are arranged in descending order (i.e., optical fibers (12)-(7)) resulting in an optical fiber ribbon that has a fiber pattern of (1), (12), (2), (11), (3), (10), (4), (9), (5), (8), (6), and (7).

Stated another way, after each of optical fibers (1)-(12) are assigned a sequential number, optical fibers (1)-(12) are paired to form a first set and a second set of optical fiber pairs where the first set of optical fiber pairs and the second set of optical fiber pairs are odd optical fiber pairs and even optical fiber pairs, respectively. Odd optical fiber pairs and even optical fiber pairs are then arranged in an alternating arrangement as shown in FIG. 18 and are subsequently ribbonized to form an optical fiber ribbon. As used herein, "odd optical fiber pairs" refers to optical fiber pairs where the lower numbered optical fiber of the optical fiber pair is an odd number (e.g., (1), (12); (3), (10); and (5), (8)). As used herein, "even optical fiber pairs" refers to optical fiber pairs where the lower numbered optical fiber of the optical fiber pair is an even number (e.g., (2), (11); (4), (9); and (6), (7)).

Figure 19:
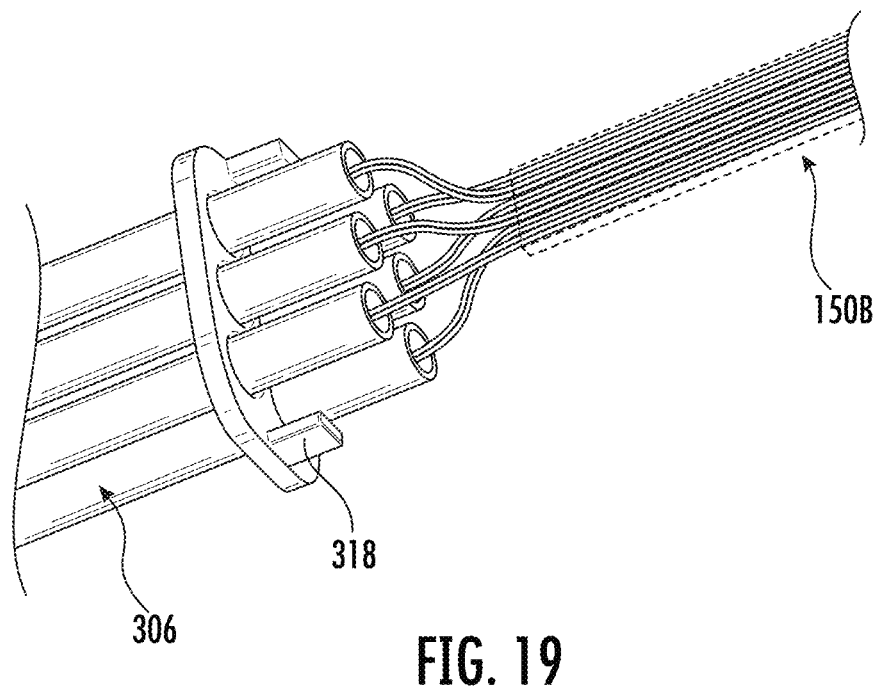
FIGS. 19 and 20 are perspective views of the optimized ribbonizing sequences of the splice assembly.

Referring now to FIG. 19, an optimum fiber pattern (FIG. 18) for pigtails 306 is shown. As mentioned previously, the fiber pattern minimizes lateral offset between fibers, which eliminates macro bend loss in splice on furcation between optical fibers and reduces the mechanical stress on optical fiber ribbons 150B prior to splicing into multi-fiber cable 308.

Figure 20:
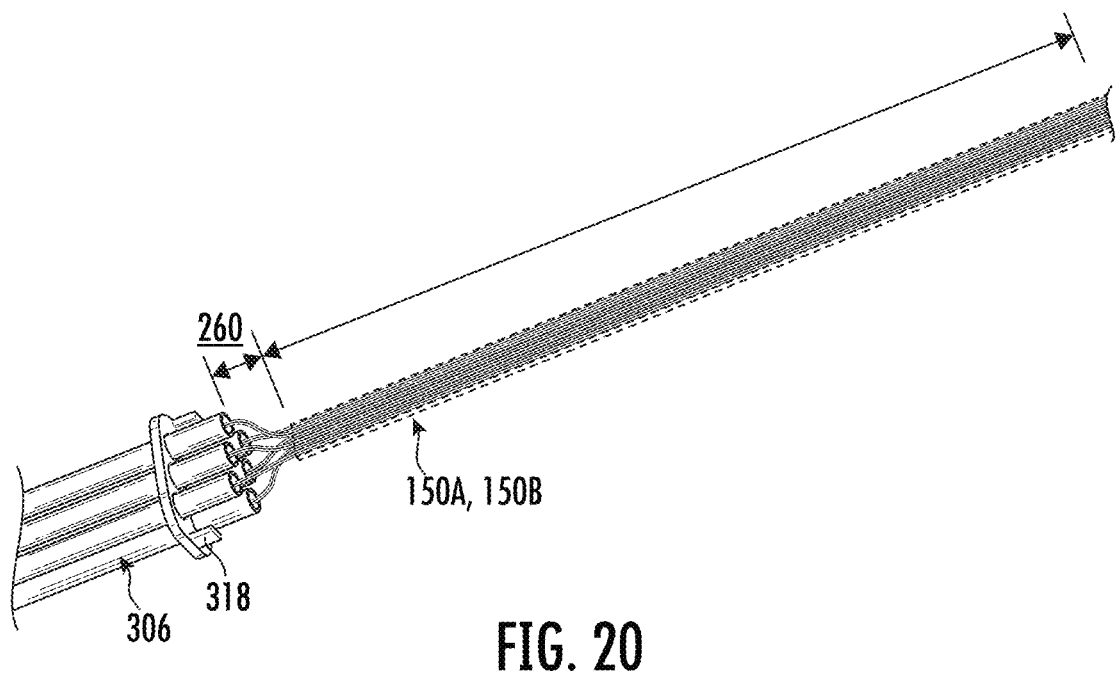

During assembly, pigtails 306 typically have pre-determined lengths which may be uniform or staggered and can be pre-made and stocked for fast product delivery. As shown in FIG. 20, a length 260 represents the distance between the edge of the pigtails 306 to the starting point of spliced optical fiber ribbons 150A, 150B, and length 262 represents the length of spliced optical fiber ribbons 150A, 150B. In some embodiments, length 260 is about 5 mm, and length 262 is about 50 mm. Due to the compact sizes of pigtails 306 and spliced optical fiber ribbons 150A, 150B, a pre-assembled configuration of pigtails 306 and spliced optical fiber ribbons 150A, 150B can be used in the field to assemble furcation assembly 350 as discussed above.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A fiber optic cable assembly comprising:
    a splice assembly including:
        a first fiber optic cable section comprising a first plurality of optical fibers, and a second fiber optic cable section comprising a second plurality of optical fibers, wherein the first fiber optic cable section comprises a plurality of pigtail cables each having a cable jacket and wherein the second fiber optic cable section comprises a jacket, and wherein a portion of the jacket is split to form a split jacket section;
        a plurality of splice joints joining ends of the first plurality of optical fibers with ends of the second plurality of optical fibers to form a plurality of fusion spliced optical fibers; and
        a splice protector applied onto the plurality of splice joints;
    a furcation assembly applied onto the splice assembly, the furcation assembly including:
        a furcation housing having a length, wherein the furcation housing covers a portion of the splice protector; and
        a boot coupled to the furcation housing, wherein the boot covers a remainder of the splice protector that protrudes from the furcation housing.

2. The fiber optic cable assembly of claim 1, wherein the splice protector protrudes from an end of the furcation housing by less than 3 mm.

3. The fiber optic cable assembly of claim 1, wherein the boot has a head portion and a tail portion, wherein the head portion covers the remainder of the splice protector that protrudes from the furcation housing.

4. The fiber optic cable assembly of claim 3, wherein the tail portion covers the split jacket section of the jacket.

5. The fiber optic cable assembly of claim 1, wherein the splice protector has a length less than 30 mm.

6. The fiber optic cable assembly of claim 1, wherein a length between the pigtail cables and an end of the splice protector is less than 25 mm.

7. The fiber optic cable assembly of claim 1, wherein the furcation assembly has a length between 40 mm and 80 mm.

8. A method of assembling a fiber optic cable assembly, wherein the fiber optic cable assembly includes a first fiber optic cable section comprising a first plurality of optical fibers, and a second fiber optic cable section comprising a second plurality of optical fibers, wherein the first fiber optic cable section comprises a plurality of pigtail cables each having a cable jacket and wherein the second fiber optic cable section comprises a jacket, and wherein a portion of the jacket is split to form a split jacket section, the method comprising:
    splicing ends of the first plurality of optical fibers to the second plurality of optical fibers to form a plurality of splice joints;
    applying a splice protector to cover the plurality of splice joints;
    arranging a furcation housing to cover a portion of the pigtail cables and a portion of the splice protector; and
    coupling a boot onto an end of the furcation housing, wherein the boot covers a remainder of the splice protector that protrudes from the furcation housing.

9. The method of claim 8, wherein the splice protector protrudes from an end of the furcation housing by less than 3 mm.

10. The method of claim 8, wherein the boot has a head portion and a tail portion, wherein the head portion covers the remainder of the splice protector that protrudes from the furcation housing.

11. The method of claim 10, wherein the tail portion covers the split jacket section of the jacket.

12. The method of claim 8, further comprising:

assigning a sequential number to a plurality of optical fibers;

pairing each of the plurality of optical fibers to form a first set and second set of optical fiber pairs;

wherein the first set of optical fiber pairs comprise odd optical fiber pairs and the second set of optical fiber pairs comprise even optical fiber pairs;

arranging the first set of optical fiber pairs and the second set of optical fiber pairs in an alternating arrangement; and ribbonizing the alternating arrangement to form an optical fiber ribbon.

13. A fiber optic harness comprising:

a splice assembly including:
- a first fiber optic cable section comprising a first plurality of optical fibers, and a second fiber optic cable section comprising a second plurality of optical fibers, wherein the first fiber optic cable section comprises a plurality of pigtail cables each having a cable jacket and wherein the second fiber optic cable section comprises a multi-fiber cable including a jacket, and wherein a portion of the jacket is split to form a split jacket section;
- a plurality of splice joints joining ends of the first plurality of optical fibers with ends of the second plurality of optical fibers to form a plurality of fusion spliced optical fibers; and
- a splice protector applied onto the plurality of splice joints;

a furcation assembly applied onto the splice assembly, the furcation assembly including:
- a furcation housing having a length, wherein the furcation housing covers a portion of the splice protector; and
- a boot coupled to the furcation housing, wherein the boot covers a remainder of the splice protector that protrudes from the furcation housing;

a plurality of first connectors individually coupled to the plurality of pigtail cables; and a second connector coupled to the multi-fiber cable.

14. The fiber optic harness of claim 13, wherein the splice protector protrudes from an end of the furcation housing by less than 3 mm.

15. The fiber optic harness of claim 13, wherein the boot has a head portion and a tail portion, wherein the head portion covers the remainder of the splice protector that protrudes from the furcation housing.

16. The fiber optic harness of claim 15, wherein the tail portion covers the split jacket section of the jacket.

17. The fiber optic harness of claim 13, wherein the splice protector has a length less than 30 mm.

18. The fiber optic harness of claim 13, wherein a length between the pigtail cables and an end of the splice protector is less than 25 mm.

* * * * *

UNITED STATES PATENT AND TRADEMARK OFFICE
CERTIFICATE OF CORRECTION

| | |
|---|---|
| PATENT NO. | : 11,808,983 B2 |
| APPLICATION NO. | : 17/521040 |
| DATED | : November 7, 2023 |
| INVENTOR(S) | : Qi Wu |

Page 1 of 1

It is certified that error appears in the above-identified patent and that said Letters Patent is hereby corrected as shown below:

On the Title Page

On the page 3, in Column 1, under "Other Publications", Line 8, delete "Writien" and insert -- Written --.

On the page 3, in Column 2, under "Other Publications", Line 19, delete "Usion" and insert -- Fusion --.

Signed and Sealed this
Thirtieth Day of April, 2024

*Katherine Kelly Vidal*

Katherine Kelly Vidal
*Director of the United States Patent and Trademark Office*